P. WAGNER.
GEAR TEETH.
APPLICATION FILED NOV. 27, 1914.

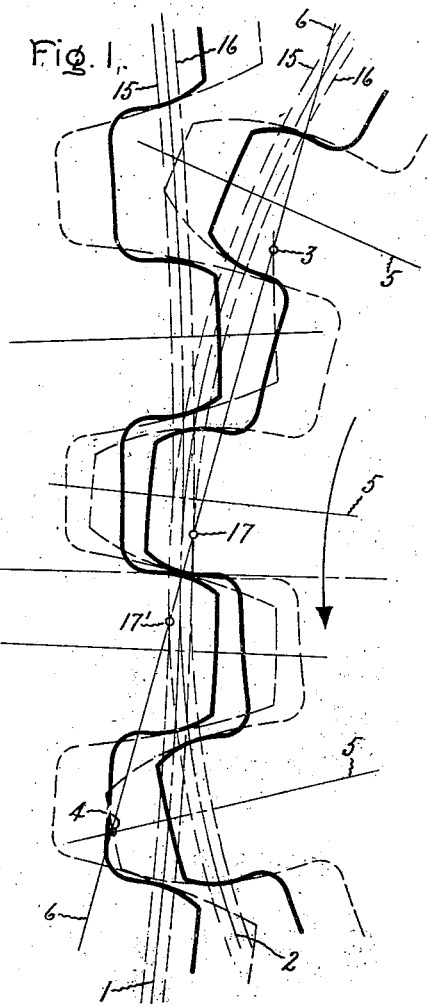

1,194,904.

Patented Aug. 15, 1916.
2 SHEETS—SHEET 2.

Witnesses:
George H. Tilden
J. Ellis Glen

Inventor:
Paul Wagner,
by
His Attorney.

UNITED STATES PATENT OFFICE.

PAUL WAGNER, OF CHARLOTTENBURG, GERMANY, ASSIGNOR TO GENERAL ELECTRIC COMPANY, A CORPORATION OF NEW YORK.

GEAR-TEETH.

1,194,904.  Specification of Letters Patent.  Patented Aug. 15, 1916.

Application filed November 27, 1914. Serial No. 874,101.

*To all whom it may concern:*

Be it known that I, PAUL WAGNER, a subject of the King of Prussia, residing at Charlottenburg, Germany, have invented certain new and useful Improvements in Gear-Teeth, of which the following is a specification.

This invention relates to toothed gear wheels, and its object is to provide intermeshing gear teeth which will operate with little or no rubbing action. Gear wheels are customarily constructed with involute or cycloidal teeth. If said teeth meet in a plane intersecting or parallel with the axes of rotation of the wheels, there will be jarring and wear, unless the length of the path of engagement of any two engaging teeth is greater than the pitch. The ordinary rule, therefore, is to make the height of the addendum or part above the pitch line equal to three-tenths of the pitch, and the dedendum or part below the pitch line equal to four-tenths of the pitch. Such teeth are objectionable, however, because the specific load they can transmit is low; first, by reason of the bending strains on the face of the teeth, and second, because the faces of the teeth not only roll one upon the other (particularly toward the beginning and end of their path of engagement), but also exert quite a noticeable sliding movement with relation to each other, which forms the main reason for the wear of the teeth and for noisy operation.

Figure 4:
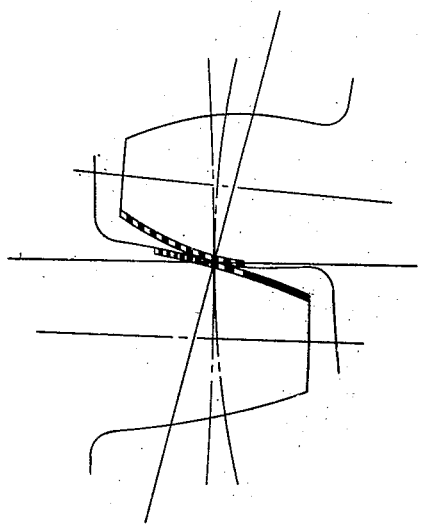
Figure 6:
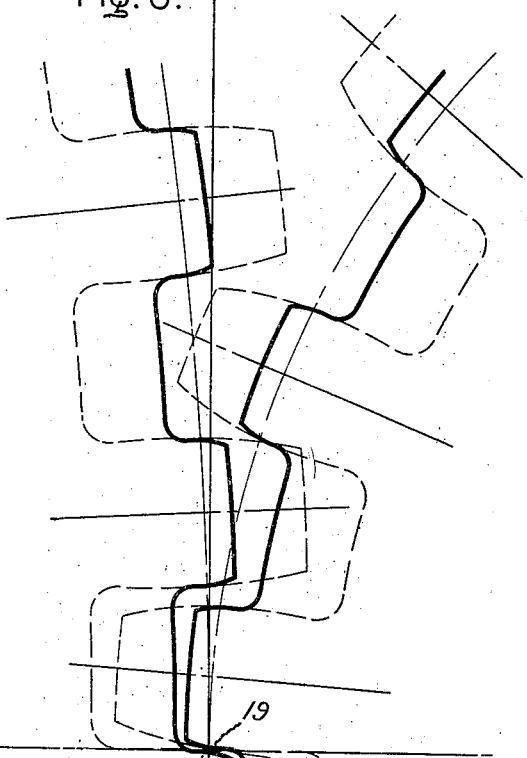
Figure 5:
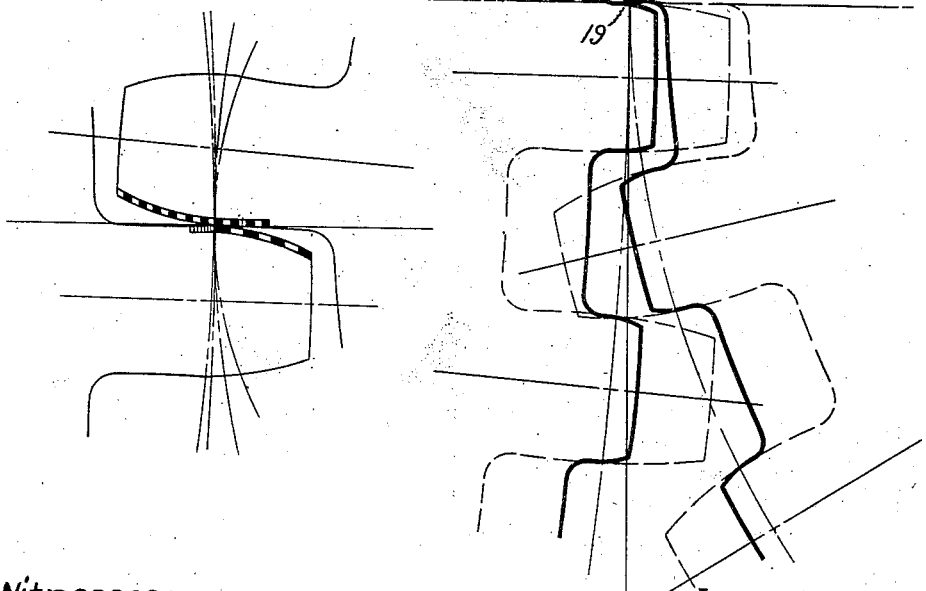

In the accompanying drawings Figure 1 shows a new form of involute teeth, the customary form being indicated by dotted lines; Fig. 2 shows, in a similar manner, cycloidal teeth; Fig. 3 is a face view of a portion of a gear wheel having the herringbone arrangement of teeth; Figs. 4 and 5 illustrate the sliding or rubbing action of the faces or involute and cycloidal gears, respectively; and Fig. 6 shows a modified form of involute teeth.

Referring first to Fig. 1, the pitch circles for the spur gear and pinion respectively are indicated at 1 and 2. The customary form of involute teeth is shown by the dotted lines, and it will be observed that when the wheels rotate in the direction of the arrow, the path of engagement between any two intermeshing teeth begins at the point 3 and ends at the point 4. In other words, it extends for a distance equal to about twice the pitch of the teeth, as indicated by the center lines 5 of the teeth. The line 6—6 of this path of engagement is taken at an angle of 15 degrees to the tangent of the segment, as is customary in gears of this type. In Fig. 4 the black sections show those portions of involute teeth which slide upon each other as the teeth pass along their path of engagement.

In Fig. 2 there are shown in dotted lines a spur gear and pinion having the customary cycloidal teeth, the generating circles being indicated at 7 and 8. The curved path of engagement lies between the points 9 and 10, and its length is substantially twice the pitch. Fig. 5 shows by the black sections the portions which rub upon each other as the teeth pass along the line 9—10.

It is evident that in respect to the possible specific pressure upon the teeth and the wear of their faces by friction a considerable improvement may be obtained if the mutual sliding can be wholly or nearly avoided. This result becomes possible if the actual engagement of the teeth takes place only at or near the point where the pitch circles touch each other; or, in other words, if the path of engagement is shortened to less than the pitch. Such a construction is feasible if a helical twisted or herringbone arrangement of the teeth is adopted. Fig. 3 shows a herringbone design of the teeth. The continuous intermeshing of wheels of this type is attained if, regarding any axial section, at least the extent of one axial division, as indicated at 11, remains continually in engagement. Since Fig. 3 shows ten points in engagement, this condition is amply fulfilled. During the movement of the teeth in the direction of the arrow 12, the individual points of engagement 11 of any two meshing teeth move axially from the one end to the other end of the teeth. This movement, which is the ordinary movement of helical teeth in mesh, is, in effect, a rolling movement in a direction parallel to the axis of the wheel. With the double helical or herringbone type of gear as shown, in which the wheel comprises two sections provided with teeth which are oppositely inclined, this movement is from the center of the wheel toward the outside on each half.

As has been stated, it is possible with a herringbone design to limit the extent of engagement in a peripheral direction to the close vicinity of the point where the pitch circles are tangent, and this fact makes it possible to avoid almost entirely any sliding of the faces of the teeth, one upon the other, if the teeth are given the forms indicated by the heavy lines in Figs. 1 and 2.

Between the dotted lines 15, 16 on either side of the pitch circles in Fig. 1, the original outline of the involute teeth is preserved. Inside and outside of this area the faces of the new teeth are considerably cut back as compared to the original configuration, so that they do not at any time come in contact. Thus the path of engagement for this type of teeth is reduced from 3—4 to 17—17', which is less than one-half the pitch. Similarly, in Fig. 2, the path of engagement for the new cycloidal teeth is reduced from 9—10 to 18—18', which is also less than one-half the pitch. Under these circumstances, the length of the teeth can be greatly shortened, preferably to about one-half the pitch.

Compared with the customary type of teeth, the new form permits a considerable increase in the pressure on their faces, because it is made at single points. Moreover, it is not necessary to make the path of engagement of the involute teeth in Fig. 1 tangential to the point where the pitch circles touch. If, therefore, as shown in Fig. 6, the two circles are regarded as rolling together, then the rolling curves 19 are radial in the direct vicinity of the point of contact of the pitch circles, while for Fig. 1 they are inclined to the radius. But with the form of tooth shown in Fig. 6, the radial component of the tooth pressure, which exists in Fig. 1, disappears. The faces of the teeth in Fig. 6 are cut back with relation to the rolling curve 19 on both sides of the point of contact of the pitch circle, so that the tangential line of engagement becomes a point, geometrically regarded. In reality, it will become a short line before and after the point of contact of the pitch circles, on account of the elastic compression of the material from which the teeth are made. With this short path of engagement and the cutting back of the teeth, they only roll on each other without sliding, and thus the wear due to friction is avoided.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. A gear wheel of the herringbone type, the radial depth of whose teeth is about one-half the pitch.

2. Gear wheels of the helical type whose path of engagement in a plane of revolution is less than one-half the pitch.

3. In a gearing, the combination of meshing gear wheels of the helical type, the radial depth of whose teeth is about one-half the pitch, said teeth having their faces cut back so that the length of the path of engagement in a plane of revolution is less than one-half the pitch.

In witness whereof, I have hereunto set my hand this 23rd day of October, 1914.

PAUL WAGNER.

Witnesses:
GUSTAV HÜLBROCK,
MANFRED REIP.